United States Patent [19]
Fitzgerald

[11] 3,788,346
[45] Jan. 29, 1974

[54] FLANGELESS VALVE

[75] Inventor: Thomas W. Fitzgerald, Westfield, N.J.

[73] Assignee: Everlasting Valve Company, Cranford, N.J.

[22] Filed: Oct. 27, 1971

[21] Appl. No.: 192,979

[52] U.S. Cl.................. 137/330, 251/170, 251/195, 251/302
[51] Int. Cl............................................ F16k 29/00
[58] Field of Search.... 137/330; 251/171, 174, 177, 251/178, 172, 195, 301, 302

[56] References Cited
UNITED STATES PATENTS

| 2,443,929 | 6/1948 | Patterson | 251/302 X |
| 2,525,989 | 10/1950 | Works | 251/172 |
| 2,868,498 | 1/1959 | Kaiser | 251/172 |
| 3,512,751 | 5/1970 | Fitzgerald | 251/178 X |
| 2,977,977 | 4/1961 | Pennington | 137/330 |
| 3,269,694 | 8/1966 | Hardison | 251/174 |

Primary Examiner—Harold W. Weakley
Attorney, Agent, or Firm—Alan W. Borst

[57] ABSTRACT

The application for patent discloses a quick opening valve which provides a seat under sealing pressure which is exerted by an elastic material disposed between the valve body and the seal. The pressure is such that the shearing action of the gate against the spring-backed seat prevents any build up of carbon particles and the like which would otherwise impair the tight closure which is required in numerous valve applications. The spring action of the elastic material is provided by allowing a portion of the compressed material to vent out a narrow annular shaped opening between the seat and the valve body. A modified valve structure provides a gate having a rotatable member which on valve closure is turned in one direction within a non-rotating ring to assure even wear on the sealing surface.

1 Claim, 5 Drawing Figures

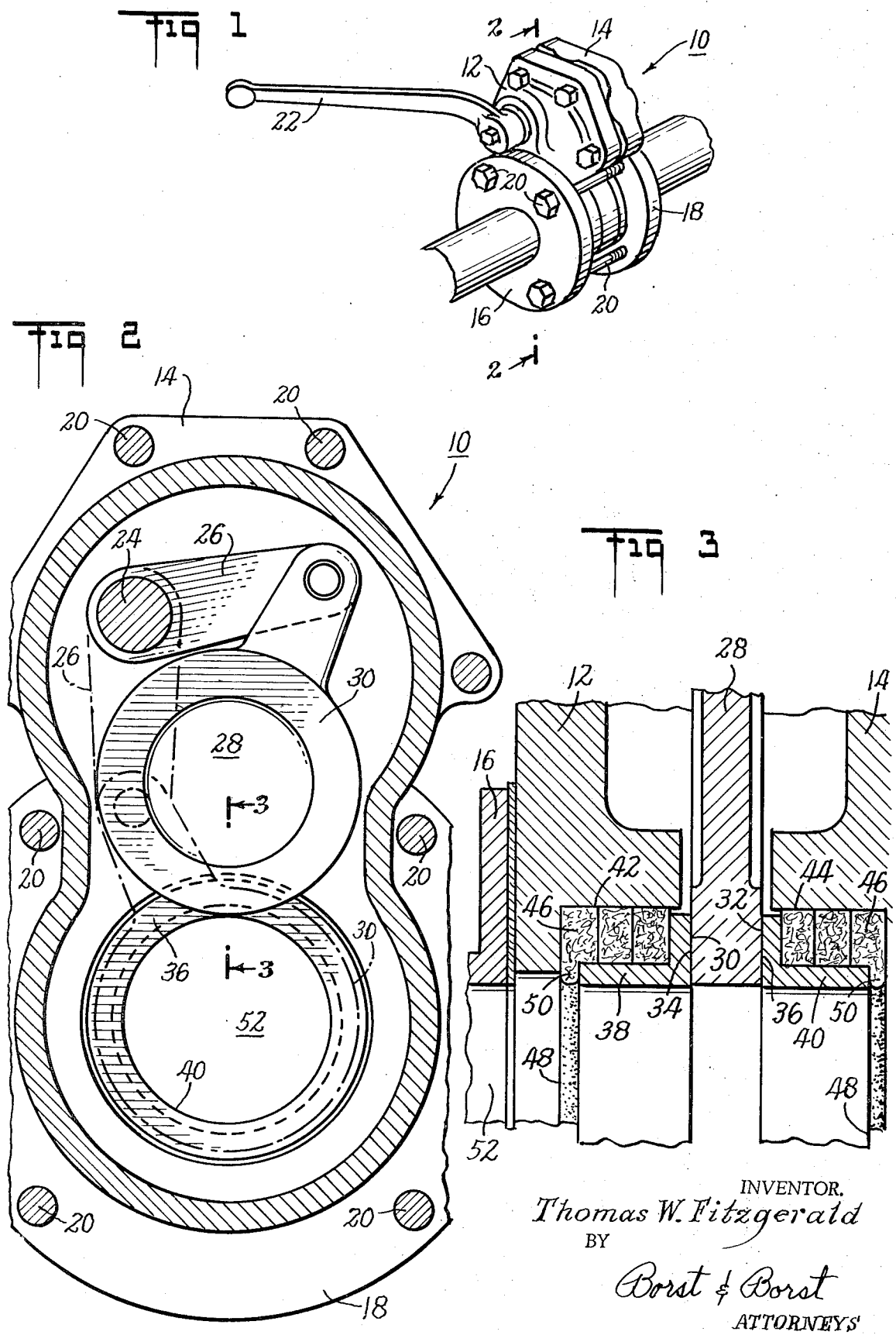

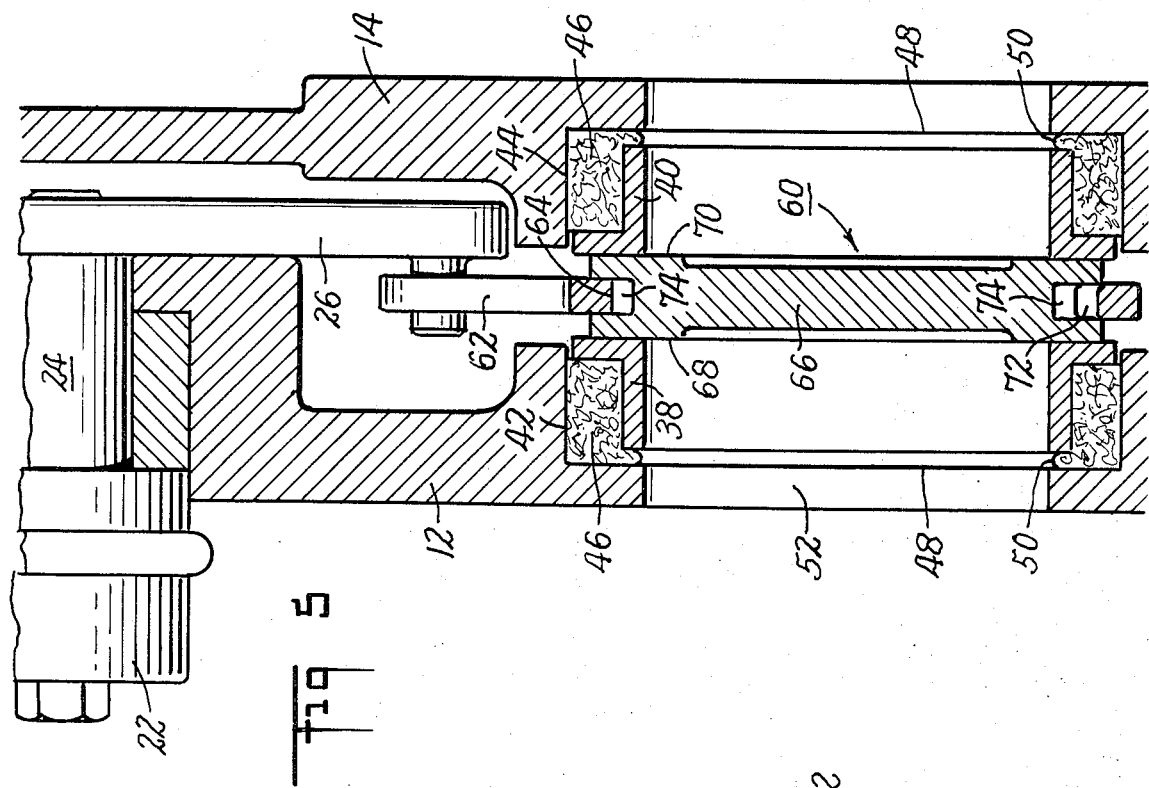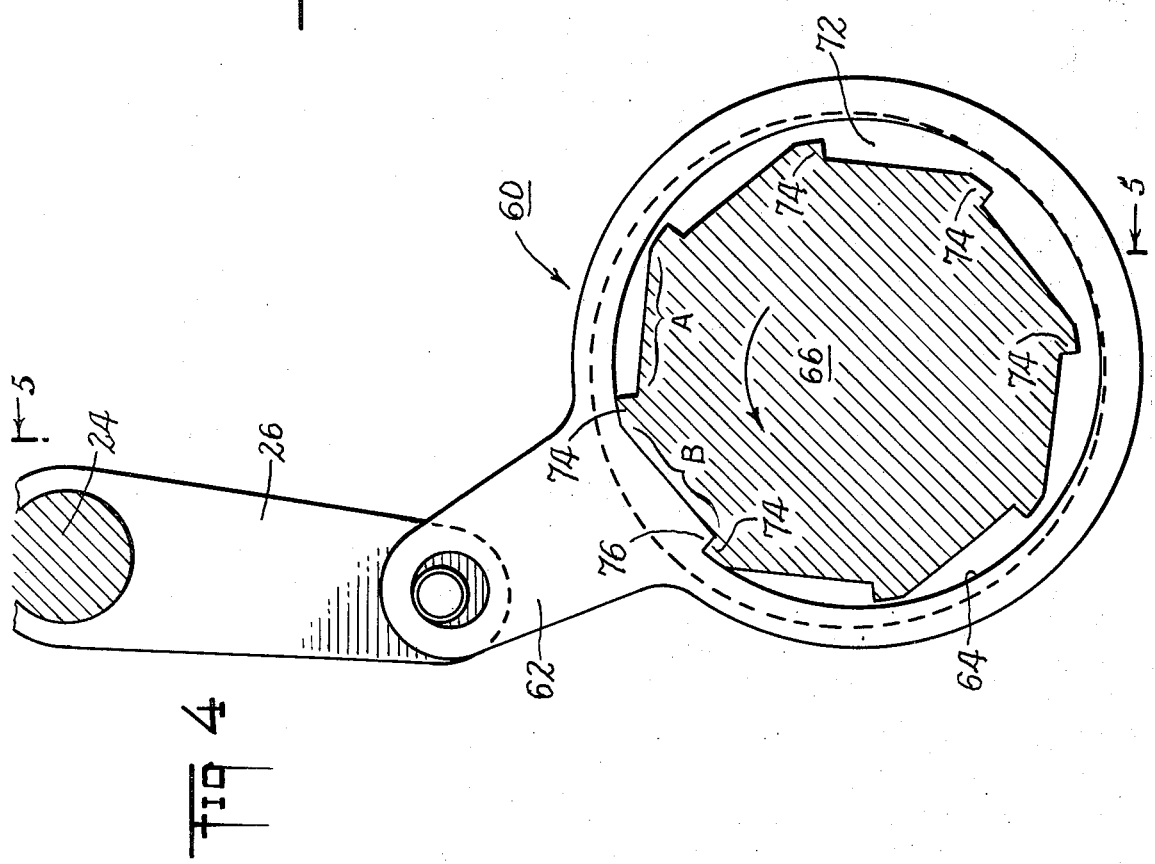

FLANGELESS VALVE

The invention relates to a valve construction and particularly to valves which open and shut by the shearing action of a disc gate against a seal provided in the body of the valve.

According to the present invention, there is provided a valve having a bubble tight seal between its gate which closes by shearing movement in engaging relation to spring-loaded annular seats on each side thereof. A compacted and resilient material in pressure contact with the seats insures a parallel arrangement of the disc and seats, and the shearing action between the operating members is productive of a leak-proof valve with such members in complete metal-to-metal contact during operation and thus devoid of foreign matter preventing such contact.

A detailed description of a preferred and modified embodiment of the invention follows being taken in conjunction with the accompanying drawings, in which:

FIG. 1 is a perspective view showing the valve mounted on a pipe ready for use;

FIG. 2 is an enlarged view taken on the line 2—2 of FIG. 1 and showing the disc gate in the open position;

FIG. 3 is a further enlarged sectional detail taken on the line 3—3 of FIG. 2 showing the spring-loaded annular seats on each side of the disc gate;

FIG. 4 is a modified form in two pieces, having a floating disc member with ratchet teeth for continuous circular wiping action; and FIG. 5 is a section taken on the line 5—5 of FIG. 4.

The valve 10 is made up of two half sections 12 and 14 and as seen in FIG. 1 is bolted and locked between pipe flanges 16 and 18 by bolts 20. A lever handle 22 is provided having post 24 to operate crank arm 26 to raise and lower disc gate 28. As shown in FIG. 2, the disc gate 28 is shown in the up position in full lines and in its lowered position by dot-dash lines. The disc gate 28 may be fabricated of an alloy of chrome and nickel, for example, and having opposite faces 30 and 32 pressed between faces 34 and 36 of "L" shaped metal seats 38 and 40.

The half body sections 12 and 14 have annular shoulder recesses 42 and 44. Elastic rings 46 are disposed within the shouldered recesses 42 and 44 and bear against the seats 38 and 40. The elastic rings 46 are formed from braided packing compressed to a solid density. The spring action is provided by allowing a portion of the compressed braided material to vent out a narrow annular slit 48 between the valve body 12 and seat 38 as shown in FIG. 3 at 50.

In operation, as the disc gate 28 is moved downwardly as seen in FIG. 2, to close the pipe opening 52 a positive shearing action is assured between seat faces 34 and 36 and the disc gate. This insures metal-to-metal seating in an environment where build-up of carbonization due to adhesion of particles may otherwise form on the sealing surfaces. A high unit stress against the sealing surfaces is assured by the elastic rings 46 between the metal seats and the valve body thus preventing build-up of material on the surfaces and assuring a near leakproof valve. When the disc gate 28 has reached its lowermost position, the crank arm 26 continues rotating for another 10 or 15° causing the disc gate 28 to rotate about its own axis and thus adds a circulatory wiping motion between the seats 38 and 40 as seen by the dot-dash position in FIG. 2. This motion is repeated on opening, in reverse, thus providing a more even wear pattern to the sealing surfaces.

As shown in FIG. 4, the crank arm 26 is shown only with the modified disc gate 60 for clarity. As shown in FIGS. 4 and 5, all like parts of the valve 10 are numbered the same with the exception of the new disc gate 60.

Disc gate 60 is a two piece carrier and disc arrangement and replaces the one piece gate 28 of the previous embodiment. The disc gate 60 comprises a carrier ring 62 having enlarged opening 64 within which is carried the floating disc member 66.

The disc 66 has faces 68 and 70 to cooperate with the sealing faces of the seats 38 and 40. As best seen in FIG. 5 the disc 66 is shown having a peripheral groove 72 within which are formed ratchet teeth 74.

Integrally formed on the inner periphery of the carrier ring 62 is a single tooth 76 adapted to engage the ratchet teeth 74 of the disc 66.

In operation, when the disc gate 60 is lowered to its lowermost position to close pipe opening 52; further rotation of the crank arm 26 causes the disc gate 60 to rotate about its own axis. The engagement of the single tooth 76 of the carrier ring 62 causes rotation of the disc 66 and indexes it from position A to B, see FIG. 4. Upon opening on its return the carrier ring 62 and its tooth 76 rides over one of the ratchet teeth 74 by virtue of the disc 66 being firmly held between seals 38 and 40 and the enlarged opening 64. Thence disc gate 60 is moved upwardly. This provides for a continuous circulatory wiping action in one direction only between the disc 66 and the faces of seats 38 and 40.

The valve disclosed herein above is used to meet the varied conditions found in the process industry where the environments include high temperature and pressure, build-up on coaking and abrasive or fiberous materials. The valve body is also supplied with steam jacketing to accommodate thermoplastics, tar, pitch, coal tar products and the like.

What is claimed is:

1. A shearing valve having a pipe opening, a body and annular seats disposed therein, a rotatable post disposed above said opening, a crank arm mounted on said post, a disc gate, said crank arm being pivotally connected to an extension member of said gate, said gate being mounted in said body for continuous rotary motion in one direction while being reciprocated across said opening to a closed position upon rotation of said post and for continuous rotary motion on the other direction upon reciprocating movement from a closed position, said seats being L-shaped and mounted in spaced relation to said body to provide a chamber and vent passage therefrom, and compressible packing material disposed in the chamber between the seat and said body.

* * * * *